C. NAPIER.
MANUFACTURE OF TEMPERED SAW BLADES.
APPLICATION FILED MAR. 11, 1915.
1,221,576.
Patented Apr. 3, 1917.
2 SHEETS—SHEET 1.
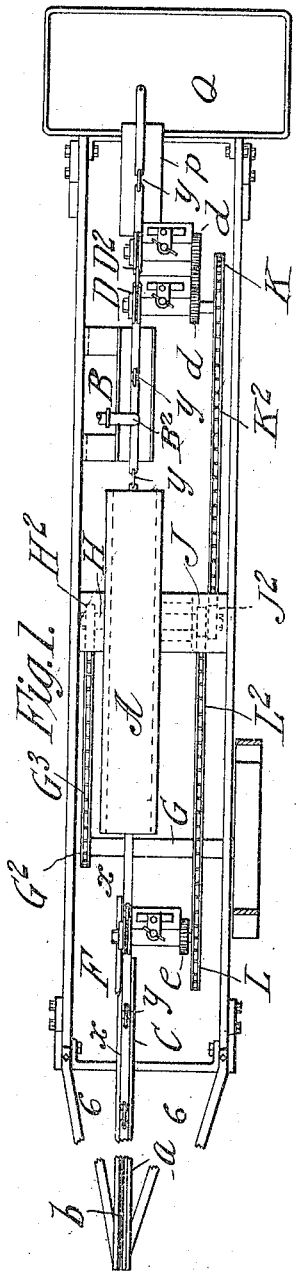
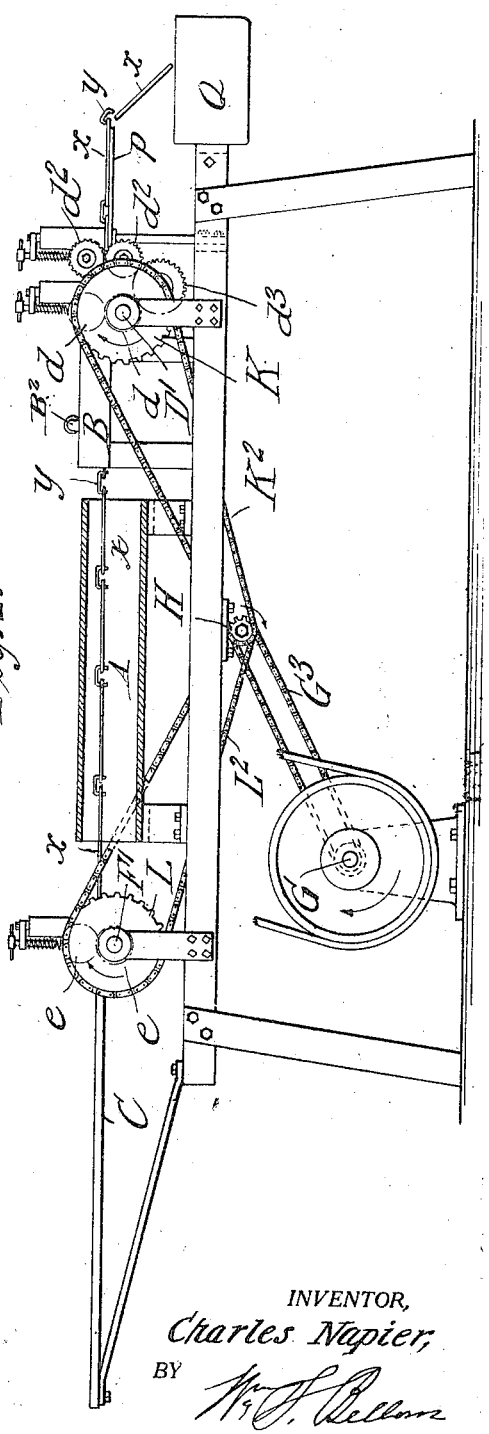
WITNESSES:
INVENTOR,
Charles Napier,
BY
ATTORNEY.

C. NAPIER.
MANUFACTURE OF TEMPERED SAW BLADES.
APPLICATION FILED MAR. 11, 1915.
1,221,576.
Patented Apr. 3, 1917.
2 SHEETS—SHEET 2.
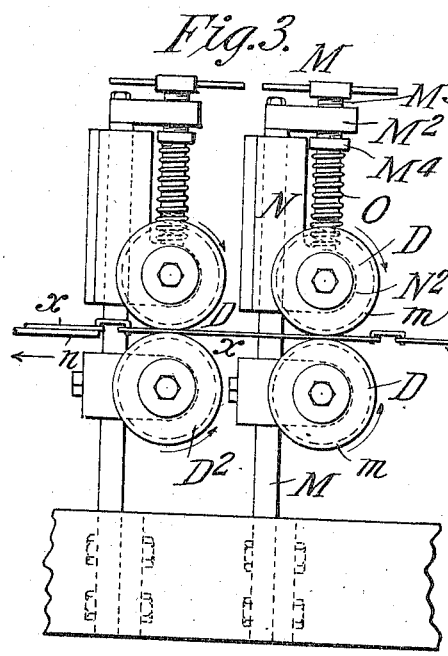
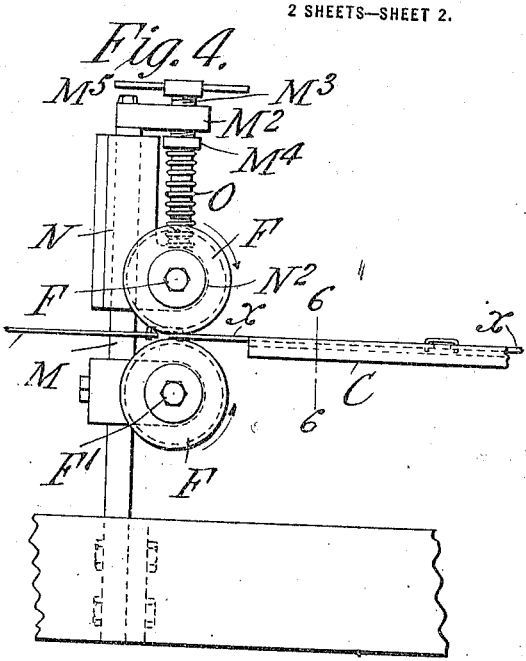
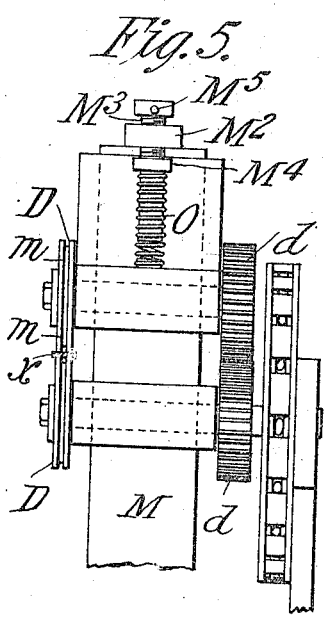
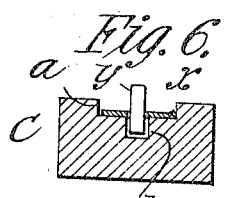
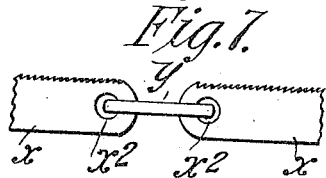
WITNESSES:
B. A. Seaver
R. M. Mowry
INVENTOR,
Charles Napier,
BY
ATTORNEY.

UNITED STATES PATENT OFFICE.

CHARLES NAPIER, OF SPRINGFIELD, MASSACHUSETTS, ASSIGNOR TO NAPIER SAW WORKS, INC., OF SPRINGFIELD, MASSACHUSETTS, A CORPORATION OF MASSACHUSETTS.

MANUFACTURE OF TEMPERED SAW-BLADES.

1,221,576.      Specification of Letters Patent.      Patented Apr. 3, 1917.

Application filed March 11, 1915. Serial No. 13,689.

*To all whom it may concern:*

Be it known that I, CHARLES NAPIER, a citizen of the United States of America, and resident of Springfield, in the county of Hampden and State of Massachusetts, have invented certain new and useful Improvements in Manufacture of Tempered Saw-Blades, of which the following is a full, clear, and exact description.

This invention relates to improvements in tempering machines, and particularly to machines for tempering hack-saw blades.

The object of the invention is to provide a machine which has the capacity not only for the tempering of an unusually large number of blades in a given time, but which, as more important, has the capability of producing tempered blades which are perfectly straight, flat, and which neither are warped nor have any tendency to warp.

A further object resides in providing a heating means through which the blades are drawn in connected relation and under tension, the blade connecting means being self-detaching when the tension on the blade chain is relieved and the blades unsupported.

The invention is described in conjunction with the accompanying drawings and is set forth in the claim In the drawings:—

Figure 1 is a plan view of the tempering machine;

Fig. 2 is a side elevation of the same the endwise open oven being shown in longitudinal section.

Fig. 3 is an elevation of the duplicated pairs of draft rolls at the forward end of the machine, and Fig. 4 is an elevation of the tension rolls near the rear end of the machine, both of these views being on a larger scale, and as seen from the side opposite that shown in Fig. 2.

Fig. 5 is an elevation of one of the sets of rollers as seen at right angles to either Figs. 3 or 4.

Fig. 6 is a cross sectional view of the saw blade support and guide as taken on the section line 6—6, shown on both Figs. 1 and 4.

Fig. 7 is a plan view of the adjacent end portions of two hack saw blades as temporarily linked, as done for and during the passage of such blades through the tempering machine.

Fig. 8 is a side view of one of the blade linking devices.

In the drawings, A represents an endwise open heating oven as commonly employed in saw works, understood as made as a comparatively long rectangular box, of fire brick or other refractory material and having the heat supplying means therefor as usual in hardening and tempering apparatuses.

Forward of the oven is a cooling apparatus B to and through which the saws coming red hot from the oven are carried, the same being understood in this representation as being in the nature of an open ended trough combined with which is a conduit $B^2$ for delivering oil or other cooling liquid onto the saws having their progression forwardly through the machine.

To the rear of the oven A and separated therefrom is the support and guideway C for the saw blades, the same having a shallow longitudinal blade-guiding channel recess or aperture $b$.

D D represent a pair of draft rolls one above another forward of the cooling apparatus and connected together by gears $d$ $d$.

F F represent a pair of tension rolls located to the rear of the oven A and forwardly of the guiding support C, and these are likewise connected by having on the carrying shafts therefor the spur gear wheels $e$ $e$.

The draft rolls are driven to rotatively run at a slightly greater speed than the tension rolls which are positively driven; and this machine is organized with a driving shaft G having a sprocket wheel $G^2$ thereon and with a countershaft H having a sprocket wheel $H^2$ around which sprocket wheels $G^2$ and $H^2$ the sprocket chain $G^3$ has running engagement.

On the opposite end of the countershaft H from the said sprocket wheel $H^2$ are two additional sprocket wheels J and $J^2$, the one $J^2$ being slightly the larger and having one or other number of teeth more than the one J.

On the shafts $D'$ and $F'$ which carry respectively the lower draft roll and the lower tension roll, and which shafts are in fixed bearings, are sprocket wheels K and L of equal size,—the sprocket chain $K^2$ running around the sprocket wheels K and $J^2$, and the sprocket chain $L^2$ running around the sprocket wheel J (which is slightly smaller than the sprocket wheel J²) and the tension roll sprocket wheel L.

As shown in Figs. 3 and 4, the upper draft roll D and the upper tension roll F are mounted in a manner to be spring-pressed toward, and yieldable relatively to, its companion roll, and the particular means for such roll mounting consists of posts or upright stationary supports M M on which slides N N are carried, said slides having horizontally extending journal members N² for the upper roll shafts.

At the top secured to and extending horizontally from the posts M are fixed bars or brackets M² through which vertical shafts or posts M³ have screw engagements with capability of vertical adjustments.

These posts have shoulders M⁴ below the brackets M² between which and the journal members N² are spiral springs encircling the posts and under more or less compression as regulated by the turning of the posts by means of the handles M⁵ provided therefor at the tops thereof.

The hack saw blades to be passed through the machine at a proper speed, first to be subjected to the suitable high tempering heat in the oven and thereafter to be cooled by the flowing thereon of the liquid while within the tank or trough B, are connected so as to run as a temporary chain, that is, the blades $x$ $x$ having perforations $x^2$ in the end portions thereof are connected by linking bars $y$ which may be done by an unskilled person, who at the rear of the machine places the saws in the shallow guiding channel $z$ formed in and longitudinally of the upper side of the support C; and the chain so formed is carried through to the feeding action of the draft rolls near the forward end of the machine.

The said bars $y$ have end lugs $y^2$, $y^2$, at acute angles to the length of the bar, and they have notches $y^3$ at the junction of the inner sides of the lugs at the lower side of the bar.

The tensioning of the chain of blades at the rear of the machine is such as to give the progression of the blades to be subjected to the tempering action under a continuous and practically uniform longitudinal strain or tension which has been found to be very important and desirable in the production of tempered blades which are perfectly straight and flat when coming out of the machine, and are at all times devoid of any tendency to warp, bow or bend.

It will be noticed that at the forward end of the machine a duplicated set of draft rolls D² are provided, the same being to all intents and purposes identical with the paired sets of rolls hereinbefore described.

These are driven as shown in Fig. 2, that is the duplicated set of draft rolls which have the gears $d^2$ connecting them are driven from one of the gears $d$ by the intermediate gear wheel $d^3$.

In the blade feeding action, by reason of the duplication of the draft rolls, there will be no discontinuance in the feeding action at the times the slightly spaced ends of the saws have reached one or the other set of such rolls, for while one of the pair may be momentarily out of engagement by reason of the break between the saws having come to place between such rolls, the other pair of draft rolls by the proper positioning thereof will have their nipping action on the intermediate part of the next blade.

The duplication of the spring pressed draft rolls also gives such increased draft power as to overcome the resistance of the tension rolls.

The draft rolls D and D², and tension rolls F have peripheral grooves $m$ therein to permit the free passage therebetween of the bars which link-connect the saw blades.

The saws advanced by the draft rolls and forwardly thereof are pushed onto a short support P at which they may be manually disconnected, or they may be left to be further pushed and precipitated into a receptacle Q in the action of which they become, as to the most thereof self separated.

In this connection it will be noted that the drawing and tension rolls serve to retain the blades connected, and as soon as the blades are free from tension and ride off the support P the connecting links $y$ self-detach from the unsupported blade whereby the latter is free to drop into the receptacle Q, the entire operation being automatic.

I claim:—

1. In a machine for tempering saw blades, in combination, an endwise open heating oven and a cooler forwardly thereof, a pair of draft rolls, geared together, forward of the cooler, a pair of tension rolls, geared together, to the rear of the oven, a support and guideway for blades to the rear of the tension rolls, a driving shaft having a sprocket wheel thereon, a countershaft having a sprocket wheel around which and the first named sprocket wheel a sprocket chain is provided, and said countershaft having second and third sprocket wheels, one of which has a greater number of teeth than the other, a sprocket wheel on one of the draft rolls, and a sprocket wheel on one of the tension rolls, and sprocket chains around the second and third mentioned sprocket wheels of the countershaft, one forwardly extended to engagement around the draft roll sprocket and the other rearwardly extended to engagement around the tension roll sprocket.

2. In a machine for tempering saw blades, in combination, an endwise open heating oven and a cooler forwardly thereof, two pairs of gear connected draft rolls forward of the cooler, a pair of gear connected tension rolls to the rear of the oven, a horizontal support for blades to the rear of the tension rolls, having a shallow longitudinally extending blade guiding channel, formed, in its base, with a narrower longitudinal channel, a driving shaft having a sprocket wheel thereon, a countershaft having a sprocket wheel around which and the first named sprocket wheel the sprocket chain is provided, and said countershaft having two additional sprocket wheels, one of which has a greater number of teeth than the other, a sprocket wheel on one of the draft rolls and a sprocket wheel on one of the tension rolls, and sprocket chains around the second and third mentioned sprocket wheels of the countershaft, one forwardly extended to running engagement around the draft roll sprocket and the other rearwardly extending to engagement around the tension roll sprocket, one pair of the draft rolls being gear connected with the other pair of draft rolls.

3. In a machine for tempering saw blades, a heating oven through which the blades pass, means for drawing the blades through the oven under tension, and temporary means for connecting the blades in a chain, said connecting means being self-detaching when the tension is relieved and the blades unsupported.

4. In a machine for tempering saw blades which are connected in chain formation for self detachment when the same are free from tension, a heating oven opened at both ends through which the chain of blades pass, means arranged at one end of the oven for pulling the blades through the oven, and means arranged at the opposite end of the oven for exerting a dragging action on the chain of blades to hold the same under tension and from detachment.

5. In a machine of the character described, an oven opened at both ends, a trough arranged at the exit end of the oven, a downwardly discharging conduit spaced above the trough, drawing means arranged beyond the trough, tensioning means arranged in advance of the entrance end of the oven, a drive shaft, means positively connecting the latter to the drawing means, and other means positively connecting the shaft to the tensioning means for driving the latter slower than the drawing means.

6. In a machine for tempering saw blades, a heating oven through which the blades pass, temporary means for connecting the blades in a chain, and means for preventing self detachment of the blades while passing through the oven, said connecting means being self-detaching when the connected blade is unsupported.

7. In a machine for tempering blades, a heating oven, a support arranged at the delivery end of the oven over which the blades pass, temporary means for connecting the blades when supported, said connecting means being self-detaching when the blades ride off the support, and means for moving the blades in connected relation through the oven and over the support.

Signed by me at Springfield, Mass., in presence of two subscribing witnesses.

CHARLES NAPIER.

Witnesses:
  G. R. DRISCOLL,
  J. D. LONG.